(12) United States Patent
Mitchell

(10) Patent No.: X8254
(45) Date of Patent: Jun. 14, 1834

(54) SAWING WOOD FOR FUEL, BLOCKS FOR SHINGLES, &C.

(76) Inventor: Harlow Mitchell

Harlow Mitchell of Watertown N. Y.
Patent issued June 14. 1834

The Schedule referred to in these Letters Patent and making part of the
same, containing a Description in the words of the said Harlow Mitchell
himself of his Improvement in the machine for sawing wood for fuel, blocks
for shingles and for sawing logs, or timbers, into short blocks for any purpose.

The use of the Invention referred to, in the Petition, is applica-
-ble to sawing wood for fuel, blocks for shingles, trunnels, or any other use, for
which short Blocks may be wanted by water, steam or horse power, the Machi-
-nery is simple, and may be easily attached to a common saw mill such as are used
for sawing Boards, & removed again at pleasure, without injury to the mill, on the
front of the saw Gate, or Frame in which the saw usually hangs, is placed a
piece of timber, perpendicularly which is boxed or notched in, so as to be let on to
upper & lower girths of the same, and is secured by keys driven either on the top,
or bottom of the girths, this timber should be about 4 by 5 inches square, but
may be of any other size, from 10 to 15 feet in front of the saw gate, as may
be most convenient and immediately fronting the last named timber, is placed a post
which will be attached in the most convenient manner to the timbers of the mill
in the floor on which the carriage runs, and the one above two horizontal girths,
will pass from one of the last named timbers to the other the lower one so low,
as to be below the floor timbers of the Mill, when the saw gate is at its high-
-est point, the other of a suitable height above, so as to secure, the lower end of the
saw, in one, and the upper end in the other, a Tenon on each end of each of
the girths, passes through a mortise, in either end of each of the parts, or perpen-
-dicular sticks described, these mortises are of greater length than the breadth of
the tenon, so as to admit of sufficient play, the tenon is secured by a pin or bolt
passing transversely through its centre, from 3 to 4 feet in front of the saw gate, a saw
is properly secured to the above named girths, standing perpendicularly with its back
to the saw gate to form a carriage on which to place the log, two timbers are placed
across the saw mill carriage, at right angles with the same, one immediately in the rear of the Fonder posts, and the other about 4 feet, in front of the saw, these
are let down on to the carriage, and secured to it by Keys. two girths running par-
-allel with the saw mill carriage are framed into the last named timbers passing
near the saw on each side. Two or more Rollers with round tenons or pivots resting in the
side timbers, of the cross carriage are placed; through these rollers several large holes are bored
near the ends, into which a crow bar or hand spike can be passed, and by turning them
the log which had been placed on the cross carriage is drawn forward before the saw, the
log is confined in the following manner, in one of the afore named timbers, which pass near
the saw, a post is inserted, nearly opposite the saw, a lateral perpendicular Mortise.
commences in the same bed piece, about a foot or less from said post, and extends forward
to two or more feet the bed piece is perforated with holes passing horizontally through said
mortise, about two inches apart another post is set in the long mortise, and secured by
a bolt passing through some of the holes named, so that this post may be moved near
to the other, or distant from it, as the size of the log to be cut may require, near
the top of the stationary part a mortise passes through it with a transverse hole through
its centre, a small piece of timber is fitted, with a long tenon, perforated with many holes
so that it, by passing through the last named mortise may be secured by a bolt, & taken
up, or let out to any required length, the other end of this piece of timber comes near to
the head of the loose or movable post & is secured to it by a lever, turning a short crank
or tenon, near the connecting end which is made thin, in form of a tenon and passes
through a slot in the end of the top piece and in to a slot in the head of the
saw post, and is secured to each by a bolt in such a manner that by bearing down
the Lever, the head of the two posts is brought nearer together, and binds the log between
the two posts in the inside of which short iron teeth are placed. – The last named
lever & the manner in which it is connected with the head of the posts is called a Jack,
and may be secured by iron joints, instead of bolts. when the Log to be sawn is
placed in the proper place, and secured by the Jack, the saw mill gate is hoisted,
and the lateral or common saw mill carriage moves forward, & the log is sawn off in the
same time which would be required to saw the same surface of Board. The Subscri-
-ber has sawn with his first experiment as much as twenty four cords of large logs in
twelve hours. The Subscriber claims as his own Invention, the application of water, steam,
or Horse power to sawing wood transversely, the particular manner of placing a lateral and transverse carriage with all such variations in the mode of securing them to each other as the peculiar formation of the Mill may require. And the peculiar manner of securing the log between the standing + movable Posts brought together by a Jack, with all such modes of securing and making the Joints, as the peculiar situation of the place, and presence of materials may make most convenient Dated at Watertown. Jefferson County N. Y. Nov. 28th 1833.

Witness
J. H. Bronson
M. Sterling

Harlow Mitchell

Recorded anew Aug 10 1850

Exd
C.J.S.

1.250